United States Patent [19]
Gershun et al.

[11] Patent Number: 5,741,436
[45] Date of Patent: Apr. 21, 1998

[54] ANTIFREEZE CONCENTRATES AND COMPOSITIONS COMPRISING NEODECANOIC ACID CORROSION INHIBITORS

[75] Inventors: Aleksei V. Gershun, Oakville; William C. Mercer, Brookfield; Peter M. Woyciesjes, Woodbury, all of Conn.

[73] Assignee: Prestone Products Corp., Danbury, Conn.

[21] Appl. No.: 567,639

[22] Filed: Dec. 5, 1995

[51] Int. Cl.$^6$ .................................................. C09K 5/00
[52] U.S. Cl. ............................ 252/76; 252/75; 252/79
[58] Field of Search .......................... 252/76, 79, 75

[56] References Cited

U.S. PATENT DOCUMENTS

| | | |
|---|---|---|
| 2,726,215 | 12/1955 | Jones . |
| 2,832,742 | 4/1958 | Weltman . |
| 3,573,225 | 3/1971 | Kondo et al. . |
| 4,342,596 | 8/1982 | Conner . |
| 4,382,008 | 5/1983 | Boreland et al. . |
| 4,390,439 | 6/1983 | Schwartz et al. . |
| 4,406,811 | 9/1983 | Christensen et al. . |
| 4,448,702 | 5/1984 | Kaes . |
| 4,488,998 | 12/1984 | Miller et al. ............................ 260/414 |
| 4,522,785 | 6/1985 | D'Errico . |
| 4,528,108 | 7/1985 | Grover . |
| 4,578,205 | 3/1986 | Yeakey et al. . |
| 4,587,028 | 5/1986 | Darden . |
| 4,588,513 | 5/1986 | Triebel et al. . |
| 4,647,392 | 3/1987 | Darden et al. . |
| 4,759,861 | 7/1988 | Ogura et al. . |
| 4,759,864 | 7/1988 | Van Neste et al. . |
| 4,851,145 | 7/1989 | Van Neste et al. . |
| 4,873,011 | 10/1989 | Jung et al. . |
| 4,946,616 | 8/1990 | Falla et al. . |
| 5,085,791 | 2/1992 | Burns . |
| 5,242,621 | 9/1993 | Miller et al. . |
| 5,269,956 | 12/1993 | Miller et al. . |
| 5,366,651 | 11/1994 | Maes et al. . |

FOREIGN PATENT DOCUMENTS

| | | |
|---|---|---|
| 2089445 | 8/1993 | Canada . |
| 242900 A2 | 10/1987 | European Pat. Off. . |
| 479470 A1 | 4/1992 | European Pat. Off. . |
| 479470 B1 | 6/1992 | European Pat. Off. . |
| 2489355 | 3/1982 | France . |
| 2138837 | 10/1984 | United Kingdom . |

OTHER PUBLICATIONS

Adamowics et al., "Fleet Test Evaluation of Engine Coolants Using Sebacic Acid Inhibitor Technology," *Engine Coolant Testing: Third Volume, ASTM STP 1192*, Beal, Ed., American Society for Testing and Materials, pp. 63–82 (1993).

American Society for Testing and Materials, 1995 Annual Book of ASTM Standards, vol. 15.05, D–3306, D–4340, pp. 102–104 and 158–162 (1995).

Beale et al., "Evaluation of a Novel Engine Coolant Based on Ethanediol Developed to Replace AL–3 (NATO S735) as the Automotive Antifreeze Used by the British Army," *Engine Coolant Testing: State of the Art, ASTM STP 705*, W.H. Ailor, Ed., American Society for Testing Materials, pp. 295–309 (1980).

British Specification, "Antifreeze, Inhibited Ethanediol, AL–39," Specification TS 10177.

(List continued on next page.)

*Primary Examiner*—Paul Lieberman
*Assistant Examiner*—Charles Boyer
*Attorney, Agent, or Firm*—Fish & Neave; Marta Gross; Pablo Hendler

[57] ABSTRACT

This invention relates to organic acid corrosion inhibitors for use in antifreeze coolant compositions. The corrosion inhibitors comprise a $C_8$ mono-carboxylic acid component, or isomers and/or salts thereof, and a neo-decanoic acid, or isomers and/or salts thereof. The corrosion inhibitors of this invention provide improved corrosion protection to metal surfaces as compared to conventional inhibitors and provide surprisingly improved corrosion protection as compared to inhibitors containing only a single mono-carboxylic acid component.

14 Claims, 1 Drawing Sheet

OTHER PUBLICATIONS

Burns, "Fleet Test Correlations of Original Equipment Coolant Pump Failures and Engine Coolant Formulations," *Engine Coolant Testing: Third Volume, ASTM STP 1192*, Beal, Ed., American Society for Testing and Materials, pp. 35–43 (1993).

Butler et al., "Inhibitor Formulations for Engine Coolants," *Br. Corr. J.*, vol. 12, No. 3, pp. 171–174 (1977).

Darden et al., "Monoacid/Diacid Combination as Corrosion Inhibitors in Antifreeze Formulations," SAE Paper No. 900804, Society of Automotive Engineers.

Exxon Chemicals Company, "Neo Acids," sales brochure.

Fefer, "Neo Acids: Synthetic Highly Branched Organic Acids," *J. Am. Oil Chemists' Soc.*, vol. 55, No. 4, pp.342A–345A (1978).

Ford Laboratory Test Methods, "A Rapid Method to Predict the Effectiveness of Inhibited Coolants in Aluminum Heat Exchangers," BL 5–1 (1981).

Hersch et al., "An Experimental Survey of Rust Preventives in Water," *J. Applied Chem.*, vol. 11, pp. 246–271 (1961).

Kirk–Othmer, "Antifreezes and Deicing Fluids," *Encyclopedia of Chemical Technology*, vol. 3, pp. 79–95 (1978, 3rd ed.).

Wiggle et al., "A Rapid Method to Predict the Effectiveness of Inhibited Engine Coolants in Aluminum Heat Exchangers," *SAE Paper 800800*, Society of Automotive Engineers Passenger Car Meeting (1980).

Wiggle et al., "The Effectiveness of Engine Coolant Inhibitors for Aluminum," *Corrosion/80*, Paper No. 69 (1980).

ANTIFREEZE CONCENTRATES AND COMPOSITIONS COMPRISING NEODECANOIC ACID CORROSION INHIBITORS

FIELD OF THE INVENTION

The present invention relates generally to organic acid corrosion inhibitors for antifreeze coolant formulations. More particularly, the present invention relates to $C_8$ mono-carboxylic acids, or isomers and/or salts thereof, and neo-decanoic acids, or isomers and/or salts thereof, for use in antifreeze coolant concentrates and compositions as corrosion inhibitors to provide prolonged corrosion protection to the metal surfaces in cooling and/or heating systems, such as those found in internal combustion engines.

BACKGROUND OF THE INVENTION

Corrosion has long been a problem when certain metals or alloys are used in applications in which they come into contact with an aqueous medium. For example, in heat-transfer systems, such as those found in internal combustion engines, alcohol-based heat transfer fluids (i.e., antifreezes) can be very corrosive to the metal surfaces of the heat-transfer systems. Compounding this problem is that the corrosion is accelerated under normal engine operating conditions (i.e., high temperatures and pressures). Aluminum surfaces, are particularly susceptible to corrosion. See, Darden et al., "Monobasic/Diacid Combination as Corrosion Inhibitors in Antifreeze Formulations," *Worldwide Trends in Engine Coolants, Cooling System Materials and Testing*, SAE Int'l SP-811, Paper #900804, pp. 135–51 (1990) ("SAE SP-811").

Corrosion inhibitors have been used to address these problems. For example, triazoles, thiazoles, borates, silicates, phosphates, benzoates, nitrates, nitrites and molybdates have been used in antifreeze formulations. See, e.g., U.S. Pat. No. 4,873,011; see also, SAE SP-811 at pp. 135–138, 145–46. However, such corrosion inhibitors have several problems, including toxicity (e.g., borates, nitrites, and molybdates), expense, and inadequate long-term protection. See U.S. Pat. No. 4,946,616, col. 1, lines 31–45; U.S. Pat. No. 4,588,513, col. 1, lines 55–64; SAE SP-811, pp. 137–38. Also, most of these inhibitors are metal-specific and as such, require multi-component formulations making them more difficult and more expensive to prepare commercially. See Canadian Patent No. 1,142,744, pp. 2–3.

Organic acids, such as mono- and/or di-carboxylic acids, have also been used as corrosion inhibitors. See, e.g., U.S. Pat. Nos. 4,382,008 (combination of $C_7$–$C_{13}$ di-carboxylic acid and conventional corrosion inhibitors); 4,448,702 (di-carboxylic acids having 3 or more carbons); 4,647,392 (combination of monobasic and dibasic adds); and 4,946,616 (combination of $C_{10}$ and $C_{12}$ diacids).

However, such organic acid formulations also suffer from a number of problems. For example, sebacic acid, which is used in several commercial antifreezes (e.g., Texaco's "Havoline" Extended Life AntiFreeze/Coolant; General Motors' "Dex-Cool" Anti-Freeze/Coolant; Canadian Tire's "Motomaster" Long Life and is currently used in the standard formulation set forth by the British Military (see *Specification TS* 10177, "Antifreeze, Inhibited Ethanediol, AL-39"), is more difficult to use commercially since it is commercially available as a solid, and as such requires heat to dissolve it in a heat transfer fluid. Also, sebacic acid is generally more expensive and difficult to obtain commercially since currently there is only one domestic industrial supplier (Union Camp Corporation). See SAE SP811, pp. 141–42. Also, sebacic acid and higher di-carboxylic acids, tend to have poor solubility in antifreeze formulations using hard water. See U.S. Pat. No. 4,578,205, col. 1, lines 52–64.

European patent publication No. 479,470 relates to corrosion inhibitors having at least one acid of the formula:

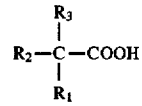

wherein the groups $R_1$, $R_2$ and $R_3$ are the same or different $C_1$–$C_{10}$ alkyls or where one of $R_1$, $R_2$ and $R_3$ is H, and the other two R groups are $C_1$–$C_{10}$ alkyls. However, this publication does not disclose any specific combination of mono-carboxylic acids nor does it teach or suggest which combinations would be useful. In fact, the only multi-acid combinations disclosed include sebacic acid, which as previously discussed has several disadvantages.

Corrosion inhibitors containing neo-decanoic acid (a mono-carboxylic organic acid) have also been suggested. U.S. Pat. No. 4,390,439 ("Schwartz et al.") relates to the use of neo-decanoic acid as a corrosion inhibitor in hydraulic fluids. However, Schwartz et al. does not teach or suggest other organic acids (except benzoic acid) used alone or in combination with neo-decanoic acid as a corrosion inhibitor.

SAE SP-811 also describes neo-decanoic acid as a possible corrosion inhibitor. However, SAE SP-811 relates to the use of combinations of mono-carboxylic acids and di-carboxylic acids, including sebacic acid, as corrosion inhibitors. Also, although SAE SP-811 suggests that neo-decanoic acid is effective as a corrosion inhibitor, SAE SP-811 teaches away from the use of neo-decanoic acid since it states that "[t]he use of neodecanoic acid is limited by solubility considerations . . . " (p. 147).

Thus, it would be desirable to provide an effective corrosion inhibitor that is easy to prepare and uses readily available raw materials.

SUMMARY OF THE INVENTION

It is an objective of this invention to provide improved organic acid corrosion inhibitors comprising a $C_8$ mono-carboxylic acid component, or isomers and/or salts thereof, and a neo-decanoic acid, or isomers and/or salts thereof. The addition of relatively small amounts of neo-decanoic acid to a $C_8$ mono-carboxylic acid component results in surprisingly improved corrosion inhibiting properties as compared to conventional corrosion inhibitors, other organic acid corrosion inhibitors, and corrosion inhibitors comprising only the $C_8$ mono-carboxylic acid component or neo-decanoic acid alone. The $C_8$ mono-carboxylic acid component is preferably 2-ethylhexanoic acid or neo-octanoic acid, and more preferably 2-ethylhexanoic acid.

Optionally, these corrosion inhibitors may also comprise other organic acid corrosion inhibitors such as di-carboxylic acids, and conventional corrosion inhibitors such as triazoles, as well as other additives such as anti-foaming agents, dyes, pH buffers, scale inhibitors, sequestration and dispersion agents.

Another objective of this invention is to provide antifreeze coolant formulations comprising these corrosion inhibitors and methods of using the formulations for corrosion protection of metal surfaces in heating and/or cooling systems, primarily of internal combustion engines.

DETAILED DESCRIPTION OF THE INVENTION

Figure 1A:
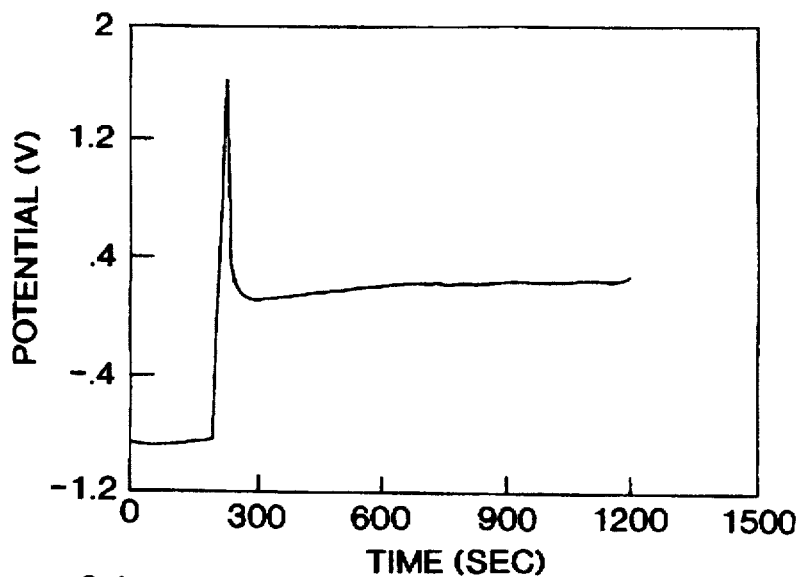
FIG. 1A shows an example of a Type I pitting potential time-graph resulting from the formulation of Example 4.

In order that this invention may be more fully understood, the following detailed description is set forth.

The corrosion inhibitors of this invention comprise a $C_8$ mono-carboxylic acid component (i.e., a single $C_8$ mono-carboxylic acid or mixtures of $C_8$ mono-carboxylic acids), or isomers and/or salts thereof, and a neo-decanoic acid component, or isomers and/or salts thereof. Neo-decanoic acid is a neoacid which is a type of mono-carboxylic acid. The term "neoacid" refers to trialkylacetic acids having the following general structure:

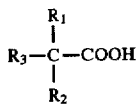

wherein the groups $R_1$, $R_2$ and $R_3$ are alkyl groups. Neoacids such as neo-octanoic and neo-decanoic acids are readily available, for example, from Exxon Chemical Company.

The addition of a relatively small amount of neo-decanoic acid to a $C_8$ mono-carboxylic acid component results in surprisingly improved corrosion inhibiting properties as compared to corrosion inhibitors having conventional and/or organic acid components, as well as corrosion inhibitors comprising only the $C_8$ mono-carboxylic acid component or neo-decanoic acid alone.

Preferably, the corrosion inhibitors of this invention comprise either 2-ethylhexanoic acid ("2-EHA") or neo-octanoic acid, or isomers and/or salts thereof, and neo-decanoic acid, or isomers and/or salts thereof. As with neo-decanoic acid, 2-EHA and neo-octanoic acid are less expensive than sebacic acid and more readily available (2-EHA may be obtained from, for example, ALLCHEM Industries, Inc., ASHLAND Chemical Co., BASF Corp., Brook-Chem Inc., EASTMAN Chemical Group and Union Carbide Corp.; neo-octanoic acid is available from, for example, Exxon Chemical Company). Also, these mono-carboxylic acids are available as liquids rather than solids (as is sebacic acid) and as such, they are more easily used to prepare corrosion inhibitors on a commercial scale.

The acid components of the corrosion inhibitors of this invention may alternatively be in the form of an alkali metal salt, ammonium salt or amine salt. Preferred salts are the alkali metal salts, and most preferred are sodium or potassium salts of the mono-carboxylic acids.

The corrosion inhibitors of this invention may also include one or more additional corrosion inhibitors, such as triazoles, thiazoles, di-carboxylic acids, phosphates, borates, silicates, benzoates, nitrates, nitrites, molybdates, or alkali metal salts thereof. The preferred corrosion inhibitors of this invention further comprise a triazole or thiazole, more preferably, an aromatic triazole or thiazole such as benzotriazole, mercaptobenzothiazole or tolyltriazole ("TTZ") and most preferably, TTZ.

Other additives may also be used depending on the application. Suitable additives include anti-foaming agents (e.g., "PM-5150" from Union Carbide Corp., "Pluronic L-61" from BASF Corp., and "Patco 492" or "Patco 415" from American Ingredients Company), dyes (e.g., "Alizarine Green," "Uranine Yellow" or "Green AGS-liquid" from Abbey Color Inc., "Orange II (Acid Orange 7)" or "Intracid Rhodamine WT (Acid Red 388)" from Crompton & Knowles Corp.), pH buffers, scale inhibitors, and/or sequestration and dispersion agents is (e.g., "Dequest" from Monsanto Chemical Company, "Bayhibit" from Miles Inc., "Nalco" or "NalPREP" from Nalco Chemical Company).

It is contemplated that the corrosion inhibitors of this invention may be used in numerous applications where metal surfaces (e.g., aluminum, copper, iron, steel, brass, solder or other alloys) are in contact with an aqueous medium. For example, they may be used in conjunction with hydraulic fluids, aqueous cutting oils, paints, soluble oils, metal cutting fluids, aircraft deicers, and greases.

The corrosion inhibitors of this invention are particularly well-suited for use in antifreeze coolant formulations, such as antifreeze coolant concentrates and compositions, for internal combustion engines.

In antifreeze coolant concentrates, a minor amount of the corrosion inhibitor is added to a major amount of a water-soluble liquid alcohol freezing point depressant. The corrosion inhibitor may be added in an amount from about 0.001% to about 5.0% (total mono-carboxylic acid by weight in the concentrate), and preferably, from about 2.0% to about 5.0%. The corrosion inhibitor comprises a $C_8$ mono-carboxylic acid component, or isomers and/or salts thereof, and a relatively small amount of neo-decanoic acid, or isomers and/or salts thereof. The amount of neo-decanoic acid used is that which is sufficient to result in a corrosion inhibitor exhibiting a synergistic effect as compared to the corrosion inhibiting effectiveness of the individual acid components. Preferably, the corrosion inhibitor comprises the $C_8$ mono-carboxylic acid component and neo-decanoic acid in the ratio from about 100:1 to about 1:1, and more preferably, about 3:1. In one preferred embodiment, the corrosion inhibitor comprises an amount sufficient of the $C_8$ mono-carboxylic acid component such that in the antifreeze coolant concentrate, this component is present from about 2.4% to about 3.3% (by weight), and more preferably about 3.1%. The neo-decanoic acid is present in an amount sufficient such that its concentration in the antifreeze coolant concentrate is from about 0.8% to about 1.1% (by weight), and more preferably about 1.0%.

The antifreeze coolant concentrate may also include one or more additional corrosion inhibitors, such as triazoles, thiazoles, di-carboxylic acids, phosphates, borates, silicates, benzoates, nitrates, nitrites, molybdates or alkali metal salts thereof. Such additional corrosion inhibitors may be added at concentrations of up to about 5.5% (by weight). Preferably, the antifreeze coolant concentrate comprises up to about 0.8% (by weight) of a triazole or thiazole, and more preferably, up to about 0.5%.

The major portion of the antifreeze coolant concentrate (i.e., 75%-99.999% (by weight), preferably 90%-99.999% (by weight)) comprises a liquid alcohol freezing point depressant. Suitable liquid alcohol freezing point depressants include any alcohol or heat transfer medium capable of use as a heat transfer fluid and preferably is at least one alcohol, selected from the group consisting of methanol, ethanol, propanol, ethylene glycol, diethylene glycol, triethylene glycol, propylene glycol, dipropylene glycol, butylene glycol, glycerol, the monethylether of glycerol, the dimethylether of glycerol, alkoxy alkanols (such as methoxyethanol) and mixtures thereof. The preferred alcohol is selected from the group consisting of ethylene glycol, diethylene glycol, propylene glycol, dipropylene glycol and mixtures thereof.

The antifreeze coolant concentrate may also comprise a sufficient amount of an alkali metal hydroxide to adjust the pH to between about 6.0 to about 10.0, preferably to about 6.9 to about 9.6. Formulations having a pH less than about 6.0 or more than about 10.0 tend to be corrosive to metal surfaces. Other additives, as described above, may also be used depending on the application.

The antifreeze formulations most commonly used are antifreeze coolant compositions. In these formulations, an antifreeze concentrate is usually diluted with water such that between 10% to about 90% (by weight) water is present in the composition, and preferably from about 25% to about 75% (by weight) water, with the balance being the antifreeze coolant concentrate.

It will be appreciated by one of skill in the art that the amount of corrosion inhibitor (and its composition) used in a specific antifreeze coolant formulation may vary when minor adjustments are made to the other components of the formulations.

The present invention also provides methods for inhibiting corrosion of the metal components in internal combustion engines. Such methods comprise the step of contacting the metals to be protected with the inventive corrosion inhibitors described above.

In order that this invention may be better understood, the following examples are set forth.

EXAMPLES

Twenty-six different antifreeze coolant concentrates were prepared (Examples 1–26). The components of these formulations are described in Tables 1–4 below. Each formulation contained ethylene glycol as the water-soluble liquid alcohol freezing point depressant, sodium hydroxide ("NaOH") to adjust the pH to about 9.0, sodium tolyltriazole ("NaTTZ"), and deionized water, in the specified amounts.

Examples 1–4, as shown in Table 1 below, correspond to known antifreeze coolant concentrates and serve as control formulations. These Examples include a formulation comprising conventional corrosion inhibitors (Example 1), a formulation comprising an organic acid (mono-carboxylic acid based) corrosion inhibitor (Example 2, contains primarily only organic acid corrosion inhibitors and a small amount of NaTTZ), and formulations comprising conventional corrosion inhibitors as well as organic acid components (di-carboxylic acid based) (Examples 3 and 4).

TABLE 1

Control Formulations

| Component (wt %) | Example No. | | | |
|---|---|---|---|---|
| | 1 | 2 | 3 | 4 |
| Ethylene Glycol | 93.76 | 94.3 | 95.7 | 95.6 |
| NaTTZ, 50% sol. | 0.22 | 0.5 | 0.2 | 0.4 |
| NaNO$_3$, 40% sol. | 0.26 | 0 | 0.5 | 0.5 |
| Na$_2$MoO$_4$, 35% sol. | 0.51 | 0 | 0.2 | 0 |
| Borax, 20% sol. in Ethylene Glycol | 2.1 | 0 | 0 | 0 |
| Phosphoric Acid, 75% sol. | 0.18 | 0 | 0 | 0 |
| Na-Mercaptobenzothiazole | 0.55 | 0 | 0 | 0 |
| Na-Silicate, Grade 40 sol. | 0.33 | 0 | 0 | 0 |
| NaOH, 50% sol. | 0.68 | 1.7 | 1.3 | 1.4 |
| Deionized Water | 1.34* | 0.1 | 0.1 | 0.1 |
| 2-Ethylhexanoic Acid | 0 | 3.2 | 0 | 0 |
| Sebacic Acid (solid) | 0 | 0.2 | 0 | 2.0 |
| Dodecanedioic Acid | 0 | 0 | 2.0 | 0 |
| Neo-Heptanoic Acid | 0 | 0 | 0 | 0 |
| Neo-Octanoic Acid | 0 | 0 | 0 | 0 |
| Neo-Decanoic Acid | 0 | 0 | 0 | 0 |

TABLE 1-continued

Control Formulations

| Component (wt %) | Example No. | | | |
|---|---|---|---|---|
| | 1 | 2 | 3 | 4 |
| Galvanostatic Pitting Potential: | | | | |
| Ep,mV | −270 | 1000 | 470 | 150 |
| (Type) | (I) | (II) | (I+) | (I) |
| ASTM D-4340 (corrosion rate, mg/cm$^2$/week) | 0.3 | 0.8 | 0.8 | 0.7 |

*Also includes antifoam, dye, and silicone

Examples 5–8 as shown in Table 2 below, are mono-carboxylic acid antifreeze concentrates each having only a single acid component: 2-EHA (Example 5), neo-heptanoic acid (Example 6), neo-octanoic acid (Example 7) and neo-decanoic acid (Example 8).

TABLE 2

Formulations of One of 2-EHA, Neo-Heptanoic Acid Neo-Octanoic Acid or Neo-Decanoic Acid

| Component (wt %) | Example No. | | | |
|---|---|---|---|---|
| | 5 | 6 | 7 | 8 |
| Ethylene Glycol | 94.7 | 94.7 | 94.6 | 94.7 |
| NaTTZ, 50% sol. | 0.5 | 0.5 | 0.5 | 0.5 |
| NaNO$_3$, 40% sol. | 0 | 0 | 0 | 0 |
| Na$_2$MoO$_4$, 35% sol. | 0 | 0 | 0 | 0 |
| NaOH, 50% sol. | 1.5 | 1.5 | 1.6 | 1.5 |
| Deionized Water | 0.1 | 0.1 | 0.1 | 0.1 |
| 2-Ethylhexanoic Acid | 3.2 | 0 | 0 | 0 |
| Sebacic Acid (solid) | 0 | 0 | 0 | 0 |
| Dodecanedioic Acid | 0 | 0 | 0 | 0 |
| Neo-Heptanoic Acid | 0 | 3.2 | 0 | 0 |
| Neo-Octanoic Acid | 0 | 0 | 3.2 | 0 |
| Neo-Decanoic Acid | 0 | 0 | 0 | 3.2 |
| Galvanostatic Pitting Potential: | | | | |
| Ep,mV | 1640 | 1445 | 2030 | −112 |
| (Type) | (II) | (II) | (II) | (I) |
| ASTM D-4340 (corrosion rate, mg/cm$^2$/week) | 0.8 | 0.6 | 0.6 | 0.7 |

Examples 9–14, as shown in Table 3 below, contain corrosion inhibitors comprising mixtures of 2-EHA and neo-decanoic acid (Examples 9–11) and neo-octanoic and neo-decanoic acids (Examples 12–14).

TABLE 3

Formulations of a Mixture of C$_8$ Mono-Carboxylic Acid and Neo-Decanoic Acid

| Component (wt %) | Example No. | | | | | |
|---|---|---|---|---|---|---|
| | 9 | 10 | 11 | 12 | 13 | 14 |
| Ethylene Glycol | 94.8 | 94.8 | 94.8 | 94.7 | 94.7 | 94.7 |
| NaTTZ, 50% sol. | 0.5 | 0.5 | 0.5 | 0.5 | 0.5 | 0.5 |
| NaNO$_3$, 40% sol. | 0 | 0 | 0 | 0 | 0 | 0 |
| Na$_2$MoO$_4$, 35% sol. | 0 | 0 | 0 | 0 | 0 | 0 |
| NaOH, 50% sol. | 1.4 | 1.4 | 1.4 | 1.5 | 1.5 | 1.5 |
| Deionized Water | 0.1 | 0.1 | 0.1 | 0.1 | 0.1 | 0.1 |
| 2-Ethylhexanoic Acid | 2.4 | 1.6 | 0.8 | 0 | 0 | 0 |
| Sebacic Acid (solid) | 0 | 0 | 0 | 0 | 0 | 0 |
| Dodecanedioic Acid | 0 | 0 | 0 | 0 | 0 | 0 |
| Neo-Heptanoic Acid | 0 | 0 | 0 | 0 | 0 | 0 |
| Neo-Octanoic Acid | 0 | 0 | 0 | 2.4 | 1.6 | 0.8 |

TABLE 3-continued

Formulations of a Mixture of $C_8$ Mono-Carboxylic Acid and Neo-Decanoic Acid

| Component (wt %) | Example No. | | | | | |
|---|---|---|---|---|---|---|
| | 9 | 10 | 11 | 12 | 13 | 14 |
| Neo-Decanoic Acid | 0.8 | 1.6 | 2.4 | 0.8 | 1.6 | 2.4 |
| Glavanostatic Pitting Potential: | | | | | | |
| Ep, mV | 2340 | 1715 | 110 | 2620 | 1390 | −61 |
| (Type) | (II) | (II) | (I+) | (II) | (II) | (I+) |
| ASTM D-4340 (corrosion rate, mg/cm²/week) | 0.4 | 1.1 | 1.2 | 0.8 | 0.5 | 0.7 |

The remaining antifreeze coolant concentrates, Examples 15–26, as shown in Table 4 below, contain comparative corrosion inhibitors. These formulations either contain mixtures of 2-EHA and neo-octanoic acid (Examples 15–17), or mixtures of neo-heptanoic acid with 2-EHA (Examples 18–20), neo-octanoic acid (Examples 21–23) or neo-decanoic acid (Examples 24–26).

Exchangers" (Galvanostatic Pitting Potential Test) and ASTM D-4340 "Standard Test Method for Corrosion of Cast Aluminum Alloys in Engine Coolants Under Heat-Rejecting Conditions" (Aluminum Hot Surface Test). These tests, described below, are well known analyses used to evaluate the effectiveness of corrosion inhibitors in engine coolants.

GALVANOSTATIC PITTING POTENTIAL

The Galvanostatic Pitting Potential Test is a standard electrochemical technique used to evaluate the effectiveness of corrosion inhibitors in the prevention of pitting corrosion. This test is used to predict the effectiveness of engine coolants in preventing pitting and crevice formation on aluminum heat exchanger alloys. The test measures the pitting potential (Ep) of aluminum alloys in an engine coolant. See Ford Motor Company, BL 5-1, supra. The test procedure is well known. See, Wiggle et at., "The Effectiveness of Engine Coolant Inhibitors for Aluminum," Corrosion 80, National Association of Corrosion Engineering Conference, Paper #69 and Wiggle et at., "A Rapid Method to Predict the Effectiveness of Inhibited Engine Coolants in Aluminum Heat Exchangers," SAE Paper #800800, Society of Automotive Engineers, Passenger Car Meeting, June 1980, Dearborn, Michigan, incorporated herein by reference.

TABLE 4

Comparative Formulations

| Component (wt %) | Example No. | | | | | | | | | | | |
|---|---|---|---|---|---|---|---|---|---|---|---|---|
| | 15 | 16 | 17 | 18 | 19 | 20 | 21 | 22 | 23 | 24 | 25 | 26 |
| Ethylene Glycol | 94.6 | 94.6 | 94.6 | 94.7 | 94.7 | 9.47 | 94.6 | 94.6 | 94.6 | 94.6 | 94.6 | 94.6 |
| NaTTZ, 50% sol. | 0.5 | 0.5 | 0.5 | 0.5 | 0.5 | 0.5 | 0.5 | 0.5 | 0.5 | 0.5 | 0.5 | 0.5 |
| NaNO₃, 40% sol. | 0 | 0 | 0 | 0 | 0 | 0 | 0 | 0 | 0 | 0 | 0 | 0 |
| Na₂MoO₄, 35% sol. | 0 | 0 | 0 | 0 | 0 | 0 | 0 | 0 | 0 | 0 | 0 | 0 |
| NaOH, 50% sol. | 1.6 | 1.6 | 1.6 | 1.5 | 1.5 | 1.5 | 1.6 | 1.6 | 1.6 | 1.6 | 1.6 | 1.6 |
| Deionized Water | 0.1 | 0.1 | 0.1 | 0.1 | 0.1 | 0.1 | 0.1 | 0.1 | 0.1 | 0.1 | 0.1 | 0.1 |
| 2-Ethylhexanoic Acid | 2.4 | 1.6 | 0.8 | 2.4 | 1.6 | 0.8 | 0 | 0 | 0 | 0 | 0 | 0 |
| Sebacic Acid (solid) | 0 | 0 | 0 | 0 | 0 | 0 | 0 | 0 | 0 | 0 | 0 | 0 |
| Dodecanedioic Acid | 0 | 0 | 0 | 0 | 0 | 0 | 0 | 0 | 0 | 0 | 0 | 0 |
| Neo-Heptanoic Acid | 0 | 0 | 0 | 0.8 | 1.6 | 2.4 | 0.8 | 1.6 | 2.4 | 2.4 | 1.6 | 0.8 |
| Neo-Octanoic Acid | 0.8 | 1.6 | 2.4 | 0 | 0 | 0 | 2.4 | 1.6 | 0.8 | 0 | 0 | 0 |
| Neo-Decanoic Acid | 0 | 0 | 0 | 0 | 0 | 0 | 0 | 0 | 0 | 0.8 | 1.6 | 2.4 |
| Galvanostatic Pitting Potential: | | | | | | | | | | | | |
| Ep, mV | 1765 | 1275 | 1315 | 875 | 552 | 880 | 1775 | 1188 | 1000 | 950 | 1305 | 648 |
| (Type) | (II) | (II) | (II) | (II) | (II) | (II) | (II) | (II) | (II) | (II) | (II) | (I+) |
| ASTM D-4340 (corrosion rate, mg/cm²/week) | 0.8 | 0.8 | 0.8 | 0.9 | 1.2 | 1.8 | 0.5 | 0.6 | 0.8 | 0.6 | 1.1 | 1.1 |

Each of the formulations tested was prepared in a mixing vessel at room temperature (approximately 20° C.) and at a pressure of 91–111 KPa. In each case, ethylene glycol was added first to the mixing vessel and while being agitated, the remaining components were added in the following order: acid components, NaOH, NaTTZ, water, and other corrosion inhibitors, if any. All of the components were obtained commercially as follows: ethylene glycol from Union Carbide; NaTTZ, 50% solution, from PMC Specialties Group; NaNO₃, 40% solution, from Chilean Nitrate Sales Corp; Na₂MoO₄, 35% solution, from North Metal & Chemical Company; NaOH, 50% solution, from Occidental Petroleum; 2-EHA from ASHLAND Chemical Co.; Sebacic acid from Union Camp Corporation; dodecanedioic acid from DuPont; and the neo-acids were from Exxon Chemical Company.

After preparation, each of the formulations of the examples was subjected to the Ford Motor Company Laboratory Test Method BL 5-1, "A Rapid Method to Predict the Effectiveness of inhibited Coolants in Aluminum Heat This test provides a measure of how well the corrosion inhibitor prevents the breakdown of the protective oxide film and subsequent pit formation on the sample metal, and provides a measure of how well the inhibitor repassivates the surface once initial pit formation has begun. In general, the results from this test can be categorized in one of three types.

In the first (Type I) (as depicted in FIG. 1A), upon polarization of the metal surface, the potential increases rapidly to some maximum level within the first few seconds. The passive film then ruptures followed by a rapid decrease in the potential. The pitting potential levels off once an equilibrium is reached between the potential, pit growth and pit repassivation. FIG. 1A depicts the results of this test on the formulation of Example 4.

Figure 1B:
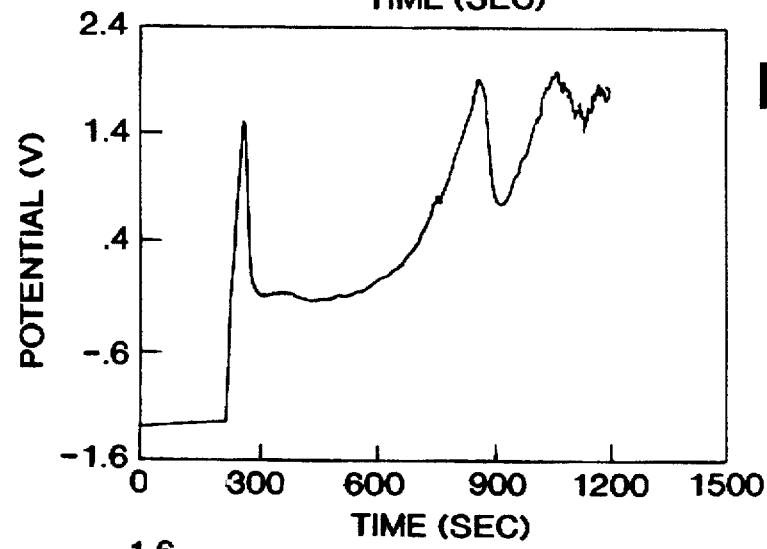
FIG. 1B shows an example of a Type I+ pitting potential time-graph resulting from the formulation of Example 3.

In the second (Type I+) (depicted in FIG. 1B), the passive film rupture occurs almost immediately upon polarization. The potential initially decreases, but then begins to rise with time. This rise is indicative of the formation of a current inhibiting film on the metal surface. FIG. 1B depicts the results of this test on the formulation of Example 3.

Figure 1C:
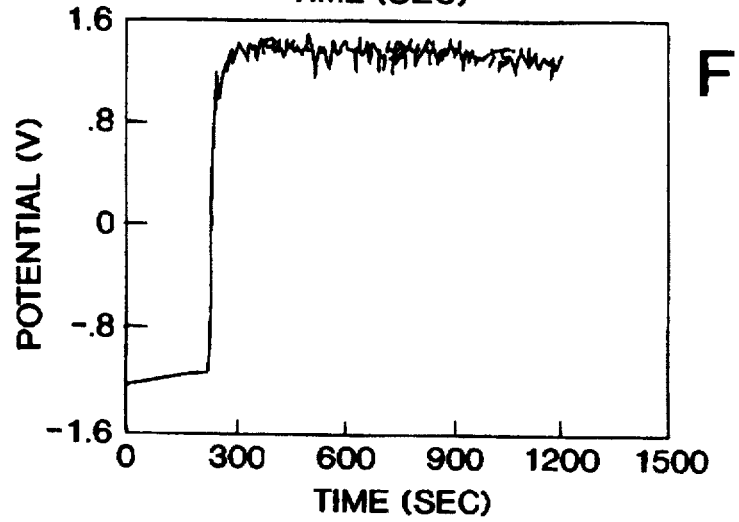
FIG. 1C shows an example of a Type II pitting potential time-graph resulting from the formulation of Example 2.

In the third type (Type II) (depicted in FIG. 1C), the potential does not decrease after rupture. Instead, the potential increases rapidly to a noble potential which remained constant or increased slightly throughout the test. FIG. 1C depicts the results of this test on the formulation of Example 2.

Most commercial antifreeze formulations have a pitting potential ranging from −200 to +200 mV. Generally, the higher (more positive) the Ep value is at a fixed current density, the more effective the antifreeze formulation is in preventing pitting corrosion. See Ford Motor Company, BL 5-1, supra; Wiggle et al., Paper #69, supra, and SAE Paper #800800, supra; and SAE SP-811, supra, at p. 138, right col., line 44.

The results of the Galvanostatic Pitting Potential Corrosion Test for the formulations of Examples 1–26 are set forth in Tables 1–4, above. For each of the formulations, the pitting potential was determined using a current density of 100 uA/cm$^2$.

As shown in Tables 1–4 above, corrosion inhibitors comprising a $C_8$ mono-carboxylic acid and neo-decanoic acid (Examples 9–14, Table 3) exhibit Ep values that are either above or within the acceptable range of −200 to +200 mV. Indeed, corrosion inhibitors comprising a $C_8$ mono-carboxylic acid and a relatively small amount of neo-decanoic acid (Examples 9 and 12, Table 3) exhibited the highest Ep values of all the formulations tested including those of the control group (Examples 1–4, Table 1).

Also, the corrosion inhibitors comprising a $C_8$ mono-carboxylic acid and a relatively small amount of neo-decanoic acid (Examples 9 and 12, Table 3) exhibited surprisingly higher Ep values than those expected from the Ep values exhibited by formulations containing only a single mono-carboxylic acid component. For example, a small amount of neo-decanoic acid added to 2-EHA (Example 9, Table 3) resulted in a formulation with a synergistic Ep of 2340 mV as compared to the Ep values of the formulations that contained only 2-EHA (1640 mV, Example 5, Table 2) or neo-decanoic acid (−112 mV, Example 8, Table 2). Similarly, a small amount of neo-decanoic acid added to neo-octanoic acid (Example 12, Table 3) resulted in a formulation with a synergistic Ep of 2620 mV as compared to the Ep values of the formulations that contained only neo-octanoic acid (2030 mV, Example 7, Table 2) or neo-decanoic acid (−112 mV, Example 8, Table 2).

The higher synergistic Ep values were not observed when using corrosion inhibitors comprising two $C_8$ mono-carboxylic acids without neo-decanoic acid (Examples 15–17, Table 4), or using corrosion inhibitors comprising neo-heptanoic acid and a $C_8$ mono-carboxylic acid (Examples 18–23, Table 4). Similarly, adding a small amount of neo-decanoic acid to neo-heptanoic acid (Examples 24–26, Table 4) did not result in a synergistic affect when compared to the formulations that contained only neo-heptanoic acid (Example 6, Table 2) or neo-decanoic acid (Example 8, Table 2).

ASTM D-4340 ALUMINUM HOT SURFACE TEST

The Aluminum Hot Surface Test is another standard technique used to evaluate the effectiveness of corrosion inhibitors. This test measures the corrosion rate of a metal sample resulting from the corrosive properties of antifreeze formulations. According to ASTM D-3306, the maximum allowed corrosion rate resulting from a tested sample is 1.0 mg/cm$^2$/week. The results for this test are also set forth in Tables 1–4 above. As shown in the Tables above, the antifreeze concentrates comprising a $C_8$ mono-carboxylic acid and a small amount of neo-decanoic acid (Examples 9 and 12, Table 3) resulted in a corrosion rate of 0.8 and 0.4 mg/cm$^2$/week, respectively, less than the ASTM D-3306 standard of 1.0 mg/cm$^2$/week. This illustrates that the corrosion inhibitors of this invention not only protect aluminum from pitting corrosion, but also from cavitation erosion that occurs in aluminum cylinder heads.

One skilled in the art will appreciate that the present invention can be practiced by other than the above-described embodiments, which are presented herein for the purpose of illustration and not of limitation, and that the present invention is limited only by the claims that follow.

We claim:

1. An antifreeze coolant concentrate comprising a liquid alcohol, which functions as a freezing point depressant, and a corrosion inhibitor composition comprising: (1) a major amount of a $C_8$ mono-carboxylic acid, or isomer, or salt, or mixtures thereof; and (2) a neo-decanoic acid, or isomer, or salt, or mixtures thereof; wherein the corrosion inhibitor composition is present in an amount such that the total mono-carboxylic acid in the concentrate is from about 2.0% to about 5.0% (by weight).

2. An antifreeze coolant concentrate comprising a liquid alcohol, which functions as a freezing point depressant, and a corrosion inhibitor composition comprising: (1) a $C_8$ mono-carboxylic acid, or isomer, or salt, or mixtures thereof; and (2) a neo-decanoic acid, or isomer, or salt or mixtures thereof; wherein the corrosion inhibitor composition is present in an amount such that the total mono-carboxylic acid in the concentrate is from about 2.0% to about 5.0% (by weight), and wherein the $C_8$ mono-carboxylic acid, or isomer, or salt, or mixtures thereof, and the neo-decanoic acid, or isomers, or salts, or mixtures thereof, are present in the corrosion inhibitor composition in the weight ratio of about 3:1.

3. The antifreeze coolant concentrate according to either claim 1 or 2, wherein the $C_8$ mono-carboxylic acid in the corrosion inhibitor composition is selected from the group consisting of 2-ethylhexanoic acid and neo-octanoic acid.

4. The antifreeze coolant concentrate according to either claim 1 or 2, wherein the mono-carboxylic acids in the corrosion inhibitor composition are in the form of sodium or potassium salts.

5. The antifreeze coolant concentrate according to either claim 1 or 2, wherein the corrosion inhibitor composition further comprises at least one compound selected from the group consisting of triazoles, thiazoles, di-carboxylic acids, phosphates, borates, silicates, benzoates, nitrates, nitrites, molybdates, or alkali metal salts thereof.

6. The antifreeze coolant concentrate according to either claim 1 or 2, wherein the corrosion inhibitor composition further comprises an aromatic triazole or thiazole.

7. The antifreeze coolant concentrate according to either claim 1 or 2, wherein the corrosion inhibitor composition further comprises benzotriazole, mercaptobenzothiazole or tolyltriazole.

8. The antifreeze coolant concentrate according to either claim 1 or 2 wherein the corrosion inhibitor comprises from about 2.4% to about 3.3% (by weight) of the $C_8$ mono-carboxylic acid, or isomer, or salt, or mixtures thereof, and from about 0.8% (by weight) to about 1.1% (by weight) of the neo-decanoic acid, or isomer, or salt, or mixtures thereof.

9. The antifreeze coolant concentrate according to either claim 1 or 2, wherein the corrosion inhibitor comprises about 3.1% (by weight) of the $C_8$ mono-carboxylic acid, or isomer, or salt, or mixtures thereof, and about 1.0% (by weight) of the neo-decanoic acid, or isomer, or salt, or mixtures thereof.

10. The antifreeze coolant concentrate according to either claim 1 or 2, wherein the liquid alcohol is selected from the group consisting of methanol, ethanol, propanol, ethylene glycol, diethylene glycol, triethylene glycol, propylene glycol, dipropylene glycol, butylene glycol, glycerol, the monoethylether of glycerol, the dimethylether of glycerol, alkoxy alkanols, and mixtures thereof.

11. The antifreeze coolant concentrate according to either claim 1 or 2 further comprising an alkali metal hydroxide in an amount sufficient to adjust the pH of the formulation to between about 6 to about 10.

12. An antifreeze coolant composition comprising the antifreeze coolant concentrate according to either claim 1 or 2, and further comprising water in an mount sufficient such that the amount of water in the formulation is from about 10% to about 90% (by weight).

13. An antifreeze coolant concentrate comprising:

a) from about 90% to about 98% (by weight) of a liquid alcohol which functions as a freezing point depressant;

b) from about 2.0% to about 5.0% (by weight) of a mixture of 2-ethylhexanoic acid, or isomers, or salts, or mixtures thereof, and neo-decanoic acid, or isomers, or salts, or mixtures thereof, c) up to about 0.5% (by weight) of tolyltriazole; and d) an alkali metal hydroxide in an amount sufficient to adjust the pH of the concentrate to between about 6.9 and about 9.6.

14. A method for inhibiting corrosion of the metals in internal combustion engines comprising the step of contacting the metals to be protected with the antifreeze coolant composition according to claim 12.

* * * * *